June 16, 1964

R. H. HURT 3,137,267

HEIGHT CLEARANCE INDICATOR

Filed Jan. 8, 1962

Robert H. Hurt
INVENTOR.

BY *Clarence A. O'Brien*
*and Harvey B. Jacobson*
Attorneys

June 16, 1964   R. H. HURT   3,137,267
HEIGHT CLEARANCE INDICATOR
Filed Jan. 8, 1962   2 Sheets-Sheet 2
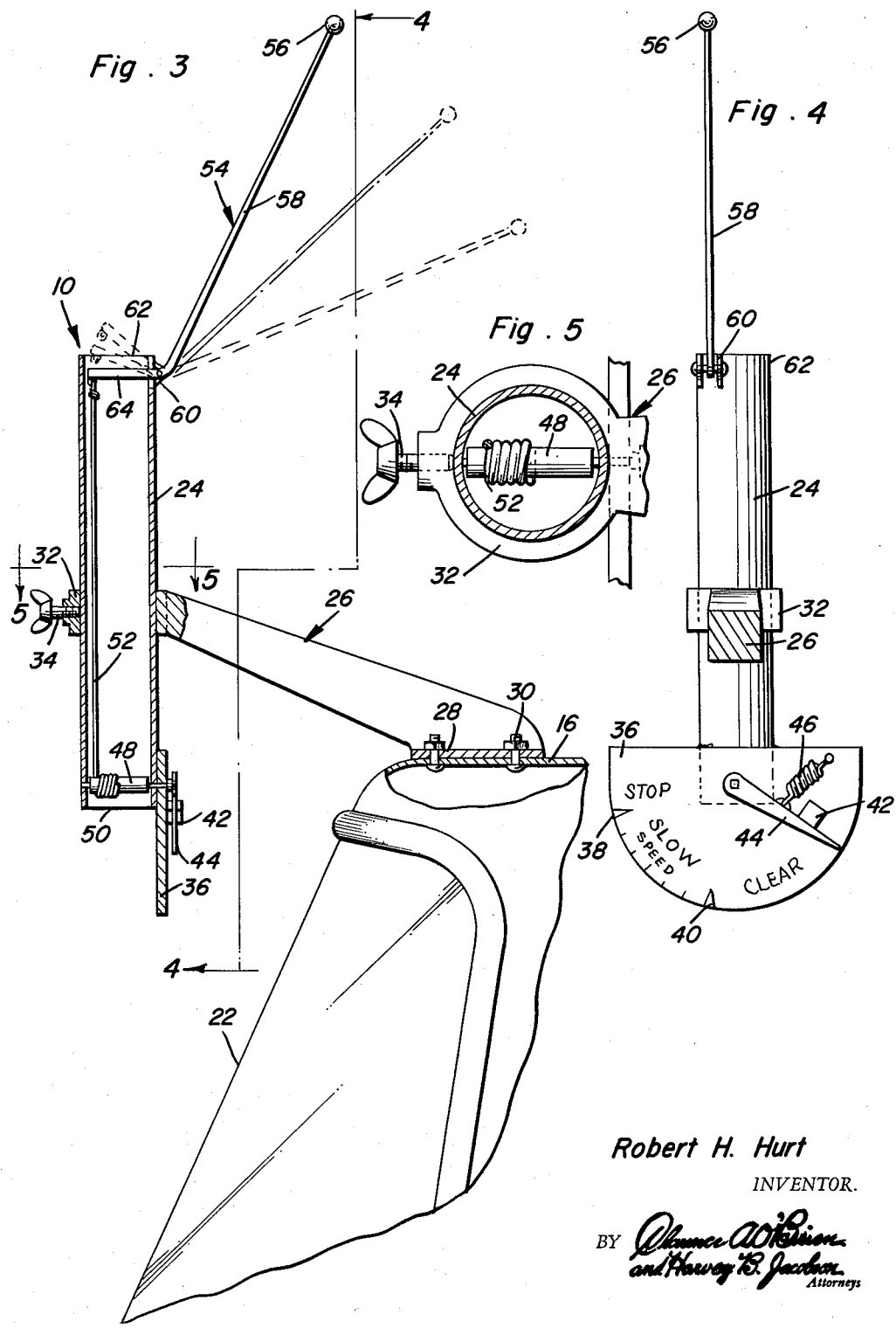
Robert H. Hurt
INVENTOR.

United States Patent Office 3,137,267
Patented June 16, 1964

3,137,267
HEIGHT CLEARANCE INDICATOR
Robert H. Hurt, 421 N. State St., Kent, Wash.
Filed June 8, 1962, Ser. No. 201,087
10 Claims. (Cl. 116—28)

This invention relates to a new and useful indicator device adapted to be mounted on motor vehicle trailer trucks, so as to provide an automatic warning of overhead obstruction.

Considerable damage to the roof portion of trailer bodies is often effected because of miscalculation in connection with the actual height of the trailer body and the clearance of an overhead obstruction such as an overhead bridge, tunnels, etc. Because of variations in the trailer body load, the relationship of the trailer body to the particular cab to which it is hitched and other such factors, the truck vehicle operator is often unaware of the actual height of the trailer body in connection with movement under an overhead obstruction. Accordingly, even where the clearance of the overhead obstruction is posted by a sign, a vehicle truck operator in reliance thereon may unwittingly proceed without caution causing considerable damage to the roof portion of the trailer body. It is therefore a primary object of the present invention to provide an attachment device adapted to be mounted on top of the cab of a trailer truck for providing an automatic warning to the vehicle operator as to the actual proximity of the trailer body roof to an overhead obstruction.

Another object in accordance with the foregoing object, is to provide a clearance height indicator which is simply mounted and adjusted on the truck cab requiring no other connection to the vehicle structure in order to provide the automatic warning.

A further object of the present invention is to provide a clearance height indicator constructed of a minimum of parts yet capable of indicating to the operator both when passage under an overhead obstruction is not possible as well as to indicate when passage therebelow is possible but must be done with caution and at a reduced speed of the vehicle. It will be appreciated, that where the difference between the height of the trailer body and the overhead clearance is relatively small, caution must be exercised because of vibratory movement of the trailer body in a vertical direction as well as variation in the clearance height of the overhead obstruction. When travelling at a high rate of speed, the road conditions may be such as to produce vibration of large enough amplitude to damage the trailer roof. The height clearance indicator of the present invention therefore is also useful in connection with indicating the safe speed at which the vehicle may pass under the overhead construction.

An additional object of the present invention is to provide a height indicator which is easily adjustable in accordance with the height of the trailer body in relation to the cab to which it is hitched, it being appreciated that foregoing height relationship may vary for any one trailer body when hitched to different cabs. Also, the height indicator construction is such as to be extremely economical and easy to install so as to render the device suitable for wide distribution, and use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 3 is an enlarged partial side view of the trailer truck cab having the height clearance indicator mounted thereon, with parts broken away and shown in section.

FIGURE 4 is a further enlarged sectional view taken substantially through a plane indicated by section line 4—4 in FIGURE 3.

FIGURE 5 is a transverse sectional view taken substantially through a plane indicated by section line 5—5 in FIGURE 3.

Figure 1:
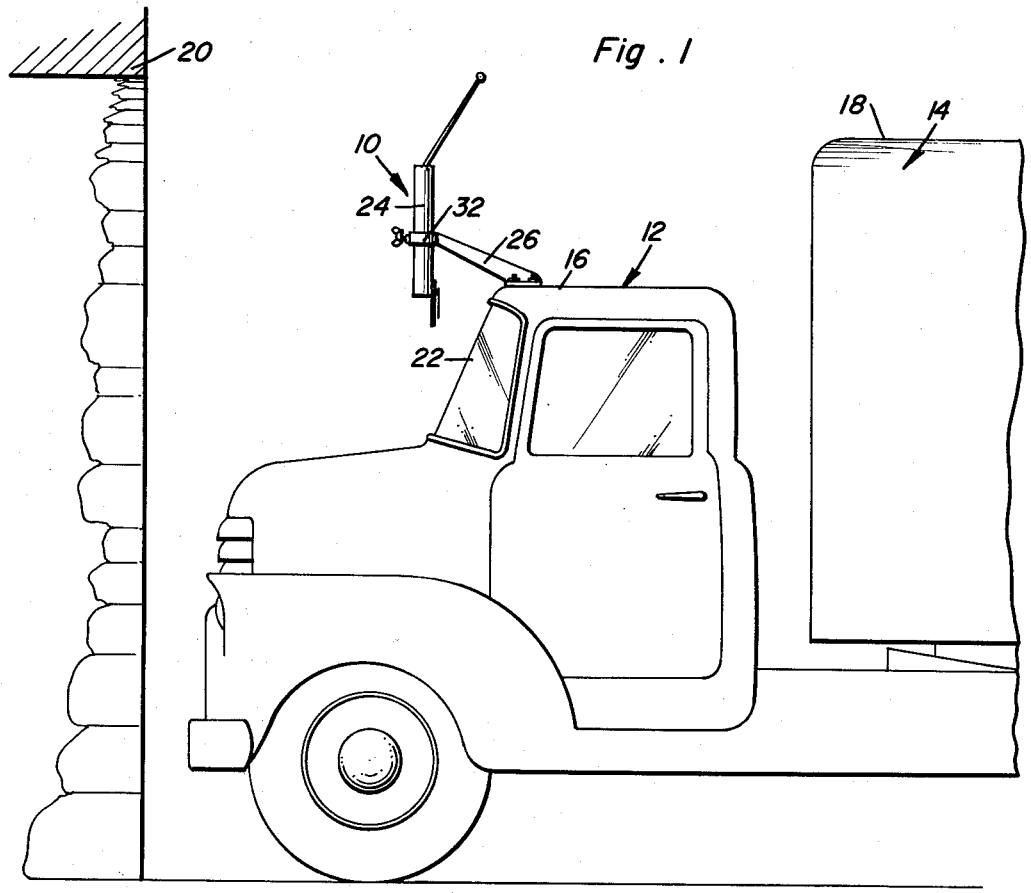
FIGURE 1 is a side view of a portion of a trailer truck just prior to entry beneath an overhead construction with the clearance height indicator being installed on the truck vehicle in accordance with the principles of the present invention.
Figure 2:
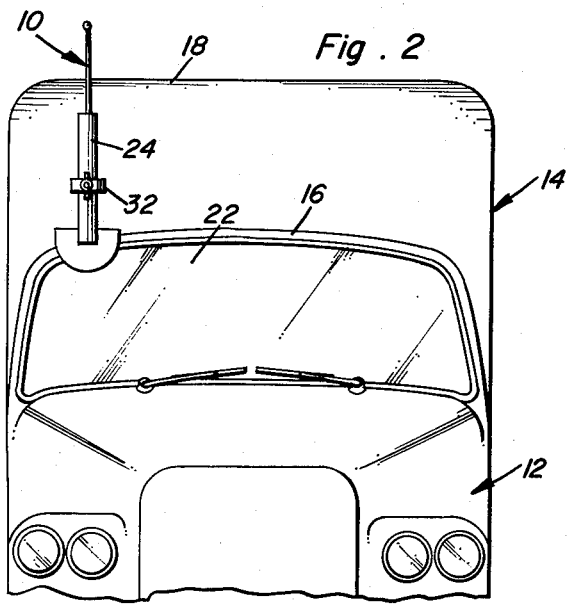
FIGURE 2 is a partial front elevational view of the truck vehicle illustrated in FIGURE 1 with the clearance type indicator mounted thereon.

Referring now to the drawings in detail, it will be observed in FIGURE 1, that the clearance height indicator generally referred to by reference numeral 10 is mounted on top of the trailer truck cab generally referred to by reference numeral 12 to which a trailer truck body 14 is hitched in the usual manner in rearwardly disposed relationship to the cab. It will therefore be apparent, that the clearance height indicator 10 shown secured to the roof portion 16 of the cab 12 projects forwardly therefrom and upwardly thereabove a predetermined distance above the roof portion 18 of the trailer body 14 and is also disposed a substantial distance forwardly of the trailer body so that it may provide a clearance indication before any possible impact may occur between an overhead obstruction 20 and the roof portion 18 of the trailer body. It will also be apparent, that the height clearance indicator 10 projects forwardly from the roof portion 16 of the cab so that it may be viewed through the front windshield 22 by the vehicle operator. As more clearly seen in FIGURE 2, the clearance height indicator may therefore be mounted in any convenient position on the roof portion 16 of the cab to one side thereof so as to not obstruct the view of the road and yet be readily viewed by the vehicle operator when desired.

Referring now to FIGURE 3 in particular, it will be observed that the clearance height indicator includes a tubular member 24 elongated in a vertical direction and adjustably positioned in the vertical direction with respect to the cab by means of a mounting bracket 26. The mounting bracket 26 therefore includes a flanged mounting portion 28 adapted to be secured in any suitable fashion to the cab roof 16 by means of fasteners 30. The bracket 26 extends upwardly and forwardly from the roof portion of the cab terminating in a collar portion 32 through which the tubular member 24 is vertically slidable and held in its vertically adjusted position by means of a wing nut setscrew 34.

The lower end of the tubular member may therefore be viewed by the operator through the front windshield 22 for which reason a scale mounting member 36 of any suitable shape or form may be secured to the tubular member facing the windshield 22. As more clearly seen in FIGURE 4, the scale mounting member 36 is provided with indicia including the stop position 38, a position 40 at which caution must be exercised by reducing the speed of the vehicle and finally a predetermined limit position defined by the stop element 42. A pointer 44 cooperates with the scale indicia on the scale member 36, the pointer being continuously biased by spring element 46 to the limit position against the stop 42. When the pointer is between the limit position against the stop 42 and the positions indicated by the mark 40, adequate clearance will exist so that the vehicle may pass under an overhead obstruction without any danger. When the pointer 44 on the other hand, is disposed between the marks 40 and 38, the vehicle must pass very slowly so as to avoid damage to the roof portion as hereinbefore indicated, while when the pointer reaches the mark 38, passage beneath an overhead obstruction is not possible without damage to the trailer body roof portion. Accordingly, the scale may be graduated between the marks 40 and 38 in accordance with what experience indicates would be the safe speed value.

The indicator pointer 44 is connected to one end of a shaft 48 which is rotatably mounted adjacent the lower end 50 of the tubular member 24. Anchored to the shaft 48 and wound thereupon, is a flexible cable 52 which extends upwardly from the shaft 48 through the tubular member 24 for connection to a feeler device generally referred to by reference numeral 54. Thus, the pointer 44 is drivingly connected to the feeler device so as to reflect the position thereof as indicated on the scale indicia hereinbefore described. Also, the spring element 46 biasing the pointer 44 against the limit stop 42, will thereby also continuously bias the feeler device 54 to a predetermined position.

The feeler device as shown by solid line in FIGURE 3, is normally held in the predetermined limit position by means of the spring 46 and is pivotally displaceable to an intermediate position by an overhead obstruction corresponding to the movement of the pointer 44 to the mark 40, which intermediate position will still be slightly above the height of the trailer body roof portion 18 but sufficiently close so as to require the exercise of caution by reducing the speed of the vehicle. Finally, as shown by dotted line in FIGURE 3, the feeler device 54 may be further downwardly displaced to the stop indicating position corresponding to movement of the pointer 44 to the stop mark 38, this latter stop indicating position of the feeler device being such that the terminal end portion 56 thereof will be at the height of the trailer body roof portion 18. The terminal end portion 56 of the feeler device is therefore connected to a rigid lever member 58, the lower end of which is pivotally mounted by the pivot bracket 60 located adjacent the upper end 62 of the tubular member 24. Rigidly connected to the lever member 58 and projecting into the tubular member 24 adjacent the upper end, is an actuating arm 64 to which the upper end of the flexible cable 52 is connected. It will therefore be apparent that displacement of the lever member 58 as indicated by the dotted lines in FIGURE 3, will cause pivotal displacement of the pointer 44 through the flexible cable 52 and the shaft 48 so as to reflect the position of the feeler device as hereinbefore indicated.

From the foregoing description, the operation and utility of the height clearance indicator will be apparent. To install the indicator, it will only be necessary to mount the mounting bracket portion 28 of the bracket member 26 on the roof portion 16 of the cab at such a location so as to bring the lower scale member 36 into proximity with the front windshield 22, the bracket member being laterally positioned at the convenience of the vehicle operator. The tubular member 24 may then be vertically adjusted by means of the setscrew 34 so that the upper terminal end 56 of the feeler device 54 will project above the top of the trailer body by such a predetermined distance so that when the feeler device is downwardly displaced sufficiently so that the pointer 44 is at the stop mark 38, the terminal end 56 of the feeler device will be exactly level with the top of the trailer body. The feeler device may then be released so that it may return under the bias of the spring 46 to its normal position, the tubular member 24 having been locked in its adjusted position prior thereto. Should the vehicle pass under an overhead obstruction without any contact being made with the feeler device 54 no deflection of the pointer 44 will occur from its limit position against the stop 42 indicating that the vehicle may proceed without danger. Should however, the feeler device be engaged by an overhead obstruction, if the corresponding deflection of the pointer 44 goes beyond the mark 40, the driver will immediately stop or reduce the speed of the vehicle so as to proceed thereafter at a safe speed as indicated by the pointer. On the other hand, should the pointer 44 be deflected to the mark 38 or therebeyond, the vehicle operator will immediately stop the vehicle before it has traversed a distance greater than the distance between the indicator and the forward end of the trailer body. The vehicle operator must then either back away and take another route or deflate the tires of the vehicle sufficiently so that the pointer 44 moves back below the stop mark 38. It will be further appreciated, that the indicator 10 is operative without any connection to any vehicle part and that it is also constructed with a minimum of parts making manufacture thereof economically feasible for wide distribution.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A clearance indicator for trailer cab hitched to a trailer having a roof substantially higher than said cab, comprising, bracket means mounted on said cab, tubular means mounted by said bracket means in a vertically adjusted position, scale means mounted on a lower end of the tubular means for viewing from the cab for all adjusted positions of the tubular means, feeler means displaceably mounted on an upper end of said tubular means projecting upwardly therefrom a predetermined distance above the height of said trailer roof for displacement from a clear indicating position downwardly to a slow indicating position slightly above the height of the trailer roof and further downwardly to a stop position at a height equal to that of said trailer roof, pointer means movably mounted by said tubular means for cooperation with said scale means to indicate said positions of said feeler means and connecting means disposed within said tubular means drivingly connecting said feeler means to the pointer means for instantaneous movement thereof in response to displacement of the feeler means.

2. The combination of claim 1 including means for continuously biasing said feeler means to said clear indicating position.

3. A clearance indicator for the trailer cab having a front windshield and hitched to a trailer disposed rearwardly thereof and having a roof substantially higher than said cab, comprising, bracket means mounted on said cab and projecting forwardly of the front windshield, tubular means mounted by said bracket means in a vertically adjusted position, scale means mounted on a lower end of the tubular means for viewing from the cab through said front windshield for all adjusted positions of the tubular means, rigid feeler means displaceably mounted on an upper end of said tubular means projecting upwardly therefrom a predetermined distance above the height of said trailer roof for displacement from a clear indicating position downwardly to a slow indicating position slightly above the height of the trailer roof and further downwardly to a stop position at a height equal to that of said trailer roof, pointer means movably mounted by said tubular means for cooperation with said scale means to indicate said positions of said feeler means, means disposed within said tubular means for drivingly connecting said feeler means to the pointer means, and means for continuously biasing said feeler means to said clear indicating position, said connecting means comprising, shaft means rotatably mounted at said lower end of the tubular means and connected to the pointer means for movement thereof, flexible cable means wound upon said shaft means and anchored thereto extending upwardly through the tubular means, an upper end of said cable means being connected to the feeler means within the upper end of the tubular means.

4. The combination of claim 3, wherein said feeler means comprises, a pivotally mounted lever member extending upwardly from the upper end of the tubular means and an actuating arm fixed to the lever member projecting into the tubular means at said upper end for connection to said connecting means.

5. A clearance indicator for a trailer cab having a front windshield and hitched to a trailer disposed rearwardly thereof and having a roof substantially higher than said cab, comprising, bracket means mounted on said cab and projecting forwardly of the front windshield, tubular means mounted by said bracket means in a vertically adjusted position, scale means mounted on a lower end of the tubular means for viewing from the cab through said front windshield for all adjusted positions of the tubular means, rigid feeler means displaceably mounted on an upper end of said tubular means projecting upwardly therefrom a predetermined distance above the height of said trailer roof for displacement from a clear indicating position downwardly to a slow indicating position slightly above the height of the trailer roof and further downwardly to a stop position at a height equal to that of said trailer roof, pointer means movably mounted by said tubular means for cooperation with said scale means to indicate said positions of said feeler means, and means disposed within said tubular means for drivingly connecting said feeler means to the pointer means said feeler means comprising, a pivotally mounted lever member extending upwardly from the upper end of the tubular means and an actuating arm fixed to the lever member projecting into the tubular means at said upper end for connection to said connecting means.

6. A clearance indicator for a trailer cab having a front windshield and hitched to a trailer disposed rearwardly thereof and having a roof substantially higher than said cab, comprising, mounting means secured to said cab, tubular means mounted by said mounting means in vertically adjusted position, indicating scale means mounted on a lower end of the tubular means in spaced relation to said front windshield for viewing in all adjusted positions of the tubular means, feeler means displaceably mounted on said tubular means at a fixed location thereon projecting upwardly therefrom a predetermined distance above the height of said trailer roof for displacement from a clear indicating position to a slow indicating position slightly above the height of the trailer roof and therebeyond to a stop position at a height equal to that of said trailer roof, pointer means movably mounted by said tubular means for cooperation with said scale means to indicate said positions of said feeler means and means disposed within said tubular means and drivingly connecting said feeler means to the pointer means for instantaneous movement thereof in response to displacement of the feeler means.

7. A clearance indicator for a trailer cab hitched to a trailer having a roof substantially higher than said cab comprising, tubular means mounted by said cab having an upper end disposed above the cab and a lower end viewed from within the cab, feeler means mounted on said tubular means for displacement with respect to said upper end from a predetermined position projecting above the roof of the trailer, position indicating means operatively mounted at said lower end of the tubular means for viewing from within the cab, biasing means for yieldably holding said feeler in said predetermined position, and mechanical means extending through said tubular means for instantaneously actuating said position indicating means in response to displacement of the feeler means to indicate proximity of the trailer roof to an overhead obstruction.

8. The combination of claim 1 wherein said feeler means comprises, a lever member extending upwardly from the upper end of the tubular means, and means securing said connecting means to the lever member, and means for yieldably holding said feeler means in said clear indicating position.

9. The combination of claim 8, wherein said connecting means comprises, shaft means rotatably mounted at said lower end of the tubular and drivingly connected to the pointer means, flexible cable means secured to said shaft and extending upwardly therefrom through said tubular means for connection to the feeler means.

10. The combination of claim 1 wherein said connecting means comprises, shaft means rotatably mounted at said lower end of the tubular and drivingly connected to the pointer means, flexible cable means secured to said shaft and extending upwardly therefrom through said tubular means for connection to the feeler means.

References Cited in the file of this patent
UNITED STATES PATENTS
2,554,371    Marx ------------------ May 22, 1951
FOREIGN PATENTS
494,424    Great Britain ---------- Oct. 26, 1938

UNITED STATES PATENT OFFICE

CERTIFICATE OF CORRECTION

Patent No. 3,137,267 June 16, 1964

Robert H. Hurt

It is hereby certified that error appears in the above numbered patent requiring correction and that the said Letters Patent should read as corrected below.

In the drawings, Sheets 1 and 2, line 3, for "Jan. 8, 1962" each occurrence, read -- June 8, 1962 --.

Signed and sealed this 3rd day of November 1964.

(SEAL)
Attest:

ERNEST W. SWIDER
Attesting Officer

EDWARD J. BRENNER
Commissioner of Patents